United States Patent [19]

Takumi et al.

[11] 4,309,312

[45] Jan. 5, 1982

[54] MANUFACTURE OF SPHERICAL ALUMINA FROM GIBBSITE

[75] Inventors: Shizuo Takumi, Kamakura; Toshio Hashimoto; Masaru Tatsushima, both of Isehara, all of Japan

[73] Assignee: Nikki-Universal Co., Ltd., Tokyo, Japan

[21] Appl. No.: 86,193

[22] Filed: Oct. 18, 1979

[30] Foreign Application Priority Data

Oct. 26, 1978 [JP] Japan ............................. 53-131779

[51] Int. Cl.$^3$ ..................... B01J 37/00; B01J 35/08; B01J 21/04; C01F 7/02
[52] U.S. Cl. .............................. 252/448; 252/313 R; 252/317; 252/463; 423/626; 423/628
[58] Field of Search ................ 252/448, 463; 423/626, 423/628, 631

[56] References Cited

U.S. PATENT DOCUMENTS

| | | | |
|---|---|---|---|
| 2,620,314 | 12/1952 | Hoekstra | 252/448 |
| 4,032,472 | 6/1977 | McCallister | 252/463 |
| 4,108,971 | 8/1978 | Takumi et al. | 423/631 |

*Primary Examiner*—P. E. Konopka
*Attorney, Agent, or Firm*—Blanchard, Flynn, Thiel, Boutell & Tanis

[57] ABSTRACT

A method of manufacturing spherical alumina comprising preparing a basic aluminum chloride solution having an aluminum concentration in the range of from 7 wt.% to 12 wt.% and a weight ratio of aluminum to chloride in the range of from 0.3 to 0.8 by reacting gibbsite with an aqueous hydrochloric acid solution at an elevated temperature, preparing an alumina hydrosol having an aluminum concentration in the range of from 9 wt.% to 15 wt.% and a weight ratio of aluminum to chloride in the range of from 0.8 to 1.5 by reacting the thus prepared solution with metallic aluminum at an elevated temperature, commingling this hydrosol with a gelling agent, dispersing the resulting mixture in the form of droplets in a suspending medium thereby to form hydrogel particles, ageing the thus obtained particles in said suspending medium and then an aqueous ammonia, washing with water, drying and calcining. The thus obtained spherical alumina is substantially free from sodium in spite of employing gibbsite as raw material.

5 Claims, No Drawings

MANUFACTURE OF SPHERICAL ALUMINA FROM GIBBSITE

BACKGROUND OF THE INVENTION

The present invention relates to a method of manufacturing spherical alumina by the oil-drop method. More particularly, it relates to a method of manufacturing spherical alumina using gibbsite as the material for preparing the alumina hydrogel that is a precursor of said spherical alumina.

The oil-drop method as taught in U.S. Pat. No. 2,620,314 has been widely utilized in the preparation of spherical alumina employed as a catalyst or as a catalyst carrier. Briefly, this method comprises commingling an alumina hydrosol with a gelling agent which hydrolyzes at an elevated temperature, dispersing the resulting mixture as droplets in a suspending medium thereby forming hydrogel particles, ageing the thus obtained hydrogel particles, washing with water, drying and calcining.

Generally speaking, it is preferable in the above-mentioned oil-drop method that the alumina hydrosol, which is a precursor of the spherical alumina, should be free from impurities. This is because the impurities contained in the alumina hydrosol reside per se in the spherical alumina and are liable to act as catalyst poisons. Due to this, the high purity alumina hydrosol for use in the oil-drop method has usually been prepared by means of either a method of digesting metallic aluminum with an aqueous hydrochloric acid solution and/or an aqueous aluminum chloride solution or a method of electrolyzing an aqueous aluminum chloride solution in an electrolytic cell provided with a porous partition wall between the anode and cathode when an impurity-containing aluminum chloride is employed as the starting material. However, as the former must use relatively expensive metallic aluminum and the latter must use a special electrolytic cell, it may safely be said that the prior art is at any rate destined to be unable to produce the high purity alumina hydrosol cheaply and consequently the spherical alumina obtained therefrom is expensive.

As is generally known, gibbsite is the principal ingredient of bauxite, and is available more cheaply than high purity metallic aluminum or aluminum chloride. However, in view of the fact that about 0.2 wt. % to 0.5 wt. % of sodium, which acts as a catalyst poison, is contained in gibbsite in the form of $Na_2O$, gibbsite, even though cheap, could not be used as the material for preparing the alumina hydrosol unless said sodium is removed by some means or other.

We have discovered that gibbsite can be utilized as part of the material for preparing the alumina hydrosol which is a precursor of the spherical alumina and that the sodium contained in the gibbsite resides per se in the hydrogel particles obtained by the oil-drop method, but said sodium can be removed very easily by washing the hydrogel particles with water.

SUMMARY OF THE INVENTION

The method of manufacturing spherical alumina according to the present invention comprises preparing a basic aluminum chloride solution having an aluminum concentration in the range of from 7 wt. % to 12 wt. % and a weight ratio of aluminum to chloride in the range of from 0.3 to 0.8 by reacting gibbsite with an aqueous hydrochloric acid solution at an elevated temperature, then preparing an alumina hydrosol having an aluminum concentration in the range of 9 wt. % to 15 wt. % and a weight ratio of aluminum to chloride in the range of from 0.8 to 1.5 by reacting the thus prepared solution with metallic aluminum at an elevated temperature, commingling this hydrosol with a gelling agent which hydrolyzes at an elevated temperature, dispersing the resulting mixture as droplets in a suspending medium thereby forming hydrogel particles, ageing the thus obtained particles in said suspending medium and then an aqueous ammonia, washing with water, drying and calcining.

As described above, the high purity alumina hydrosol for use in the oil-drop method has hitherto been prepared by means of a method of digesting metallic aluminum with an aqueous hydrochloric acid solution and/or an aqueous aluminum chloride solution, typically by means of a method of digesting high purity metallic aluminum with an aqueous hydrochloric acid solution. In this case, the preparation of the alumina hydrosol wherein the weight ratio of aluminum to chloride is 1.15 can be generally represented by the following formula:

In contrast, when the alumina hydrosol wherein the weight ratio of aluminum to chloride is 1.15 is prepared by means of the method according to the present invention there take place the reactions represented by the following formulas:

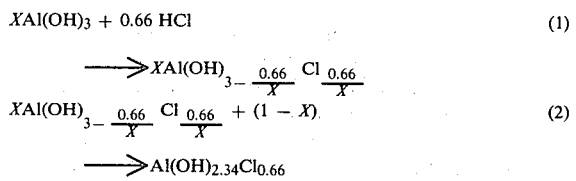

wherein X expresses the utilization rate of gibbsite which is 0.5 in the case where 50% of the amount of aluminum required for alumina hydrosol is obtained from gibbsite. For caution's sake, it is added that it is ideal but practically impossible at the present stage to prepare the alumina hydrosol for use in the oil-drop method only from gibbsite.

In preparing the alumina hydrosol according to the present invention, as expressed by the above-mentioned formulas (1) and (2), first gibbsite is reacted with an aqueous hydrochloric acid solution at an elevated temperature ordinarily in the range of from 100° C. to 200° C., preferably in the range of from 140° C. to 180° C. to thereby prepare a basic aluminum chloride solution. Next, this basic aluminum chloride solution is reacted with a metallic aluminum at an elevated temperature ordinarily in the range of from 50° C. to 150° C., preferably in the range of from 80° C. to 120° C., thereby preparing an alumina hydrosol having an aluminum concentration in the range of from 9 wt. % to 15 wt. % and a weight ratio of aluminum to chloride in the range of from 0.8 to 1.5. This alumina hydrosol is not substantially different from the alumina hydrosol obtained from the reaction of a metallic aluminum with an aqueous hydrochloric acid solution except that the former contains impurities such as sodium and so forth caused by gibbsite, and its aluminum concentration and weight ratio of aluminum to chloride have relation to the apparent bulk density of a final spherical alumina product. Accordingly, the aluminum concentration and weight ratio of aluminum to chloride of the alumina hydrosol are selected, depending on the apparent bulk density of a desired spherical alumina, from within the above-mentioned range.

In this connection, the relations between the aluminum concentration and weight ratio of aluminum to chloride of the alumina hydrosol and the apparent bulk density of the spherical alumina product are as mentioned below.

| Aluminum concentration (wt. %) | Weight ratio of aluminum of chloride (Al/Cl) | Apparent bulk density of spherical alumina (g/cc) |
|---|---|---|
| 9 – 15 | 0.8 – 1.0 | 0.75 – 0.60 |
| | 1.0 – 1.2 | 0.60 – 0.40 |
| | 1.2 – 1.5 | 0.40 – 0.25 |

The oil-drop method is applicable to the alumina hydrosol prepared as mentioned above. This oil-drop method is disclosed in U.S. Pat. No. 2,620,314. First, the alumina hydrosol is commingled with a gelling agent which is hydrolyzable at elevated temperature and manifests a strong buffering action. As this gelling agent, such a weak base as hexamethylenetetramine, urea, or mixture thereof is ordinarily employed. In the case where hexamethylenetetramine is employed as the gelling agent, said hexamethylenetetramine is used in the form of a solution thereof having a concentration in the range of from about 20 wt. % to 40 wt. %. And, as to the amount of said solution to be used, it suffices to be an amount sufficient for neutralizing chloride ion contained in the alumina hydrosol. For instance, when the hexamethylenetetramine solution having a concentration of 30 wt. % is commingled with the alumina hydrosol having a 26 wt. % $Al_2O_3$ concentration, the appropriate mixing ratio of said alumina hydrosol to said solution is in the range of from about 3:1 to about 1:1.5.

The mixture of alumina hydrosol and gelling agent is dispersed as droplets in a suspending medium (said medium is ordinarily accommodated within a vertical tower) held at a temperature sufficient to give rise to hydrolysis of the gelling agent and effect gelation of the hydrosol within a desired period of time. As the suspending medium for this purpose, an oil immiscible with water, for instance, such as refined paraffin oil is employed. This temperature of the suspending medium is held in the range of from 50° C. to 105° C., preferably in the range of from 85° C. to 95° C. While the hydrosol passes, as droplets, through the suspending medium, a part of the gelling agent is hydrolyzed with ammonia, and during this period, said sol is gelled to thus form a hydrogel.

The thus obtained hydrogel is then aged within the oil homogeneous to the suspending medium. The temperature for this ageing is substantially the same as the gel-forming temperature, that is, it is ordinarily in the range of 50° C. to 105° C., preferably in the range of from 85° C. to 100° C., and the time for said ageing is at least 10 hours, preferably it is in the range of from 14 hours to 24 hours. In the course of this ageing process, the gelling agent remaining in the spherical hydrogel particles hydrolyzes, thereby achieving the further polymerization of alumina. Thereafter, spherical alumina hydrogel particles are subjected to ageing in an aqueous ammonia having an ammonia concentration in the range of from 1 wt. % to 3 wt. % at a temperature in the range of from 50° C. to 105° C. for at least about 7 hours.

Alternatively, the method disclosed in U.S. Pat. No. 4,108,971 is also applicable to the ageing of alumina hydrogel particles with ammonia. According to said method, the spherical alumina hydrogel particles which have been aged in the suspending medium are contacted with an aqueous ammonia having an ammonia concentration in the range of from about 0.05 wt. % to about 0.5 wt. % for a first time period of at least one hour and then subjecting the thus aged particles to further ageing by contacting said particles with aqueous ammonia for a second time period of at least about six hours and during said second time period continuously increasing the concentration of ammonia in said aqueous ammonia from an initial ammonia concentration in the range of from about 0.05 wt. % to about 0.5 wt. % up to a final ammonia concentration in the range of from about 0.8 wt. % to about 2.5 wt. %. According to this two-stage ammonia ageing procedure there can be obtained spherical alumina particles having superior physical properties.

Upon finishing the ageing, the spherical alumina hydrogel is then washed thoroughly with about 90° C. hot water. This washing step is significant to the present invention. That is, in the preparation of alumina hydrosol according to the present invention, gibbsite is employed as a part of the material therefor, and therefore the impurities contained in the gibbsite still remain in the spherical alumina hydrogel which has been aged. However, such impurities, in particular sodium, which is unwanted because it is a catalyst poison, can be removed, in the form of sodium salt, through the aforesaid washing step to a substantially complete extent. The spherical particles, upon finishing the washing with hot water, are dried at a temperature in the range of from 95° C. to 315° C. for a period of from 2 hours to 24 hours, and thereafter calcined at a temperature in the range of from 425° C. to 750° C. for a period of from 2 hours to 12 hours, whereby a desired spherical alumina can be obtained. As disclosed in U.S. Pat. No. 4,108,971, spherical particles after drying may be calcined in an atmosphere containing at least 30 mol. % of water in the form of vapor. When calcining is performed in such an atmosphere, spherical alumina particles are allowed to possess a superior physical stability, in particular thermal stability.

As detailed above, according to the present invention, about 50% of the amount of aluminum required for preparing the alumina hydrosol for use in the oil-drop method can be supplied by gibbsite, and in addition thereto the sodium contained in gibbsite can be removed by washing the aged spherical alumina hydrogel particles in water. Therefore, despite the use of gibbsite, the present invention can produce spherical alumina which is by no means inferior in quality to the spherical alumina obtained by using a metallic aluminum and an aqueous hydrochloric acid solution as materials.

DESCRIPTION OF THE PREFERRED EMBODIMENTS

Example 1

| | | |
|---|---|---|
| $Al_2O_3$ | 64.5 | wt. % |
| $Na_2O$ | 0.27 | wt. % |
| $Fe_2O_3$ | 0.007 | wt. % |

| | | |
|---|---|---|
| SiO$_2$ | 0.008 | wt. % |

350 g of commercially available gibbsite of the above-mentioned composition and 765 ml of 25% hydrochloric acid were placed in a pressure reactor equipped with a stirrer and the same was reacted, with stirring, at 180° C. for 2 hours. The resulting basic aluminum chloride solution was analyzed as follows:

| | | |
|---|---|---|
| Al | 9.9 | wt. % |
| Al/Cl (weight ratio) | 0.55 | |
| Na | 0.055 | wt. % |

This basic aluminum chloride solution was diluted with about 520 ml of water, thereafter this diluted solution was put in a reactor charged with 400 g of metallic aluminum, and the same was reacted at a temperature in the range of from 90° C. to 100° C. for 8 hours. The resulting alumina hydrosol was analyzed as follows:

| | | |
|---|---|---|
| Al | 13.5 | wt. % |
| Al/Cl (weight ratio) | 1.16 | |
| Na | 0.035 | wt. % |

To 500 ml of the above alumina hydrosol was added 505 ml of 27 wt. % hexamethylenetetramine solution. After commingling thoroughly, this mixture was dispersed as droplets in a vertical column maintained at about 92° C. Then, the hydrogel particles recovered from the bottom of the column were transferred to a separate vessel and were aged for 15 hours in paraffin oil maintained at a temperature in the range of from 95° C. to 100° C. Next, a 1.5 wt. % aqueous ammonia maintained at 92° C. was flowed into the bottom of the same vessel so as to substitute the paraffin oil, and the hydrogel particles were aged within this aqueous ammonia for 8 hours. Upon finishing the ageing, the hydrogel particles were washed in running water having a temperature of 90° C. for 7 hours, and then were dried thoroughly at 120° C. The thus dried particles were calcined in air at 350° C. for 1 hour, at 510° C. for 1 hour and further at 360° C. for 2 hours to thereby obtain spherical alumina A.

Example 2

350 g of the same gibbsite as employed in Example 1 and 972 ml of 25% hydrochloric acid were placed in a reactor equipped with a stirrer and the same was reacted, with stirring, at 180° C. for 1.5 hours. The resulting basic ammonium chloride solution was analyzed as follows:

| | | |
|---|---|---|
| Al | 8.3 | wt. % |
| Al/Cl (weight ratio) | 0.44 | |
| Na | 0.046 | wt. % |

This basic ammonium chloride solution was diluted with 700 ml of water. The resulting diluted solution was put in a reactor charged with 400 g of metallic aluminum, and the same was reacted at a temperature in the range of from 95° C. to 100° C. for 9 hours. The resulting alumina hydrosol was analyzed as follows:

| | | |
|---|---|---|
| Al | 13.6 | wt. % |
| Al/Cl (weight ratio) | 1.15 | |
| Na | 0.029 | wt. % |

The thus obtained alumina hydrosol was treated according to the entirely same operation as described in Example 1 to thereby obtain spherical alumina B.

Comparative Example

Alumina hydrosol was prepared from metallic aluminum and hydrochloric acid without using gibbsite at all.

500 ml of 12% hydrochloric acid was put in a reactor charged with 200 g of metallic aluminum, and the same was reacted at a temperature in the range of from 100° C. to 110° C. The thus obtained alumina hydrosol was analyzed as follows:

| | | |
|---|---|---|
| Al | 13.5 | wt. % |
| Al/Cl (weight ratio) | 1.15 | |
| Na | 0.0002 | wt. % |

Next, this alumina hydrosol was treated through the same operation as described in Example 1 to thereby obtain spherical alumina X.

The properties of each of the spherical alumina obtained in Example 1, Example 2 and Comparative Example are as shown in Table-1 below.

TABLE 1

| Spherical alumina | A | B | X |
|---|---|---|---|
| utilization rate of gibbsite (wt. %) | 47 | 38 | 0 |
| apparent bulk density (g/ml) | 0.52 | 0.53 | 0.53 |
| spherical diameter (mm) | 1.5 | 1.5 | 1.5 |
| average crushing strength (Kg) | 5.4 | 5.6 | 5.5 |
| surface area (m$^2$/g) | 210 | 208 | 210 |
| Cl (wt. %) | 0.28 | 0.30 | 0.25 |
| Na (wt. %) | 0.008 | 0.0008 | 0.0005 |

As is clear from the showing in the above table, spherical alumina A and B prepared by using gibbsite as material are observed to exhibit substantially same properties in comparison with spherical alumina X prepared without using gibbsite at all. And, the amount of Na contained in the spherical alumina A wherein the utility rate of gibbsite is 47% as well as the spherical alumina B wherein the utility rate of gibbsite is 38% is 0.0008 wt. %. Said amount is in no way one to exert a bad influence on the action of catalyst or catalyst carrier. And, taking account of the fact that the amount of Na contained in the material gibbsite is 0.27 wt. % as Na$_2$O, it is clear from Table-1 that 99 wt. % of more of the Na can be removed by washing the aged particles in water.

What is claimed is:

1. A method of manufacturing spherical alumina particles comprising the steps of:
    reacting, at an elevated temperature, gibbsite containing sodium impurity with an aqueous hydrochloric acid solution in proportions effective to form an aqueous basic aluminum chloride solution having an aluminum concentration in the range of from 7 wt. % to 12 wt. %, a weight ratio of aluminum to chloride in the range of from 0.3 to 0.8 and containing said sodium impurity;

then reacting, at an elevated temperature, said aqueous basic aluminum chloride solution with metallic aluminum in proportions effective to form an alumina hydrosol having an aluminum concentration in the range of from 9 wt. % to 15 wt. % and a weight ratio of aluminum to chloride in the range of from 0.8 to 1.5 and containing said sodium impurity;

then commingling said alumina hydrosol with a gelling agent which hydrolyzes at an elevated temperature and then dispersing droplets of said mixture in a suspending medium under conditions effective to transform said droplets into hydrogel particles;

ageing said hydrogel particles first in said suspending medium and then in aqueous ammonia;

then washing said hydrogel particles with water to remove said sodium impurity;

then drying and then calcining said hydrogel particles to obtain spherical alumina particles.

2. A method according to claim 1 wherein the reaction between gibbsite and aqueous hydrochloric acid solution is performed at a temperature in the range of from 100° C. to 200° C.

3. A method according to claim 1 wherein the reaction between basic aluminum chloride solution and metallic aluminum is performed at a temperature in the range of from 50° C. to 150° C.

4. A method according to claim 1 wherein the gelling agent is hexamethylenetetramine, urea or mixture thereof.

5. A method according to claim 1 in which said hydrogel particles are washed with water having a temperature of about 90° C.

* * * * *

UNITED STATES PATENT AND TRADEMARK OFFICE
CERTIFICATE OF CORRECTION

PATENT NO. : 4,309,312

DATED : January 5, 1982

INVENTOR(S) : Shizuo Takumi et al.

It is certified that error appears in the above—identified patent and that said Letters Patent is hereby corrected as shown below:

Column 8, line 7, after "claim 1" insert -- or claim 2 --.

Signed and Sealed this

Thirtieth Day of March 1982

[SEAL]

Attest:

Attesting Officer

GERALD J. MOSSINGHOFF

Commissioner of Patents and Trademarks